UNITED STATES PATENT OFFICE.

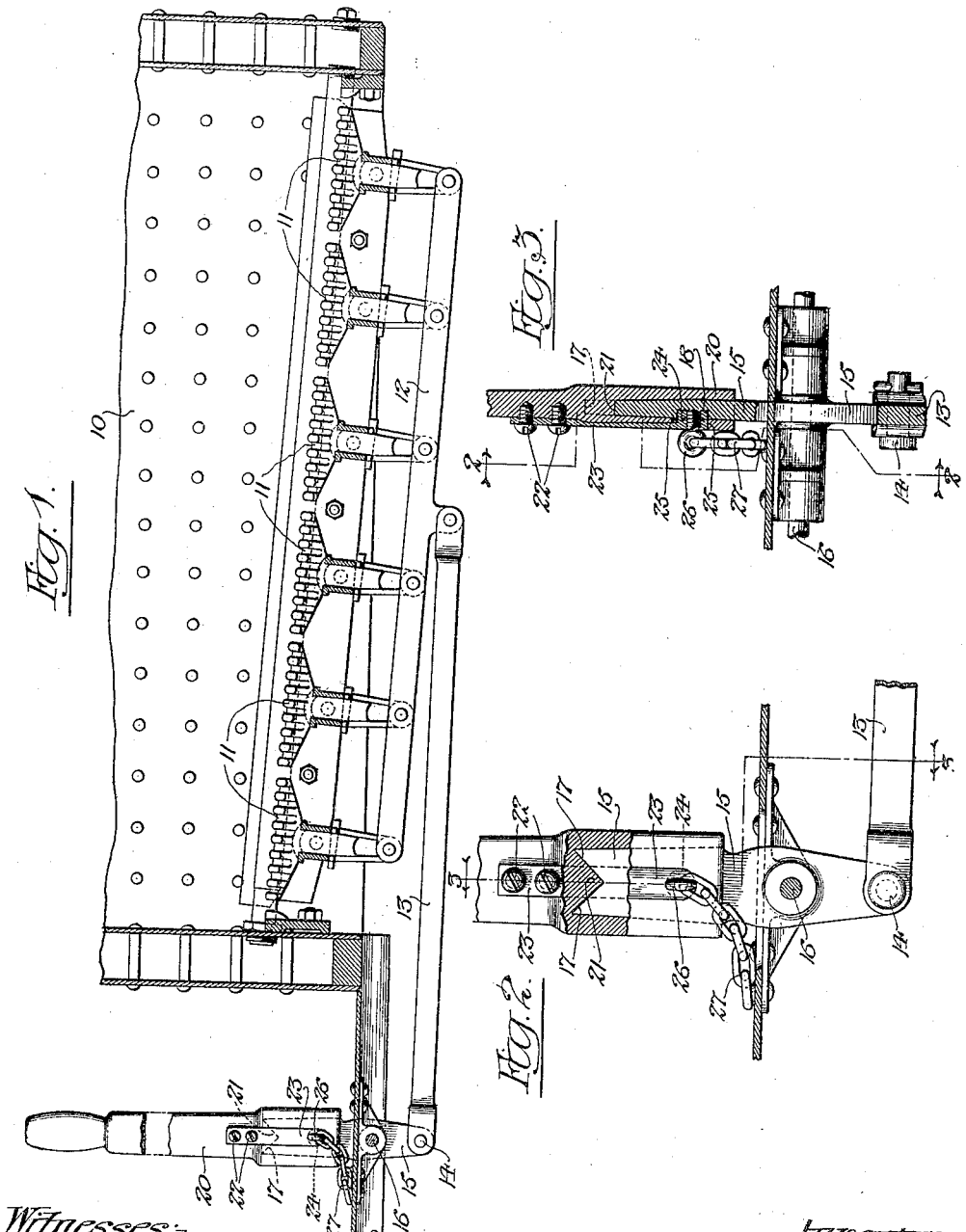

DAVID BUISSONO, OF BLUE ISLAND, ILLINOIS.

SHAKER-BAR FOR FIRE-GRATES.

1,111,133.        Specification of Letters Patent.     Patented Sept. 22, 1914.

Application filed January 27, 1913. Serial No. 744,512.

*To all whom it may concern:*

Be it known that I, DAVID BUISSONO, a citizen of the United States, residing at Blue Island, county of Cook, and State of Illinois, have invented certain new and useful Improvements in Shaker-Bars for Fire-Grates, of which I do declare the following to be a full, clear, and exact description, reference being had to the accompanying drawing, forming part of this specification.

Figure 1 is a view in vertical, longitudinal section through the lower portion of a locomotive fire box, the grate bars and operating mechanism being shown in elevation. Fig. 2 is an enlarged detail view, partly in side elevation and partly in vertical section on line 2—2 of Fig. 3, showing the manner of attaching my improved shaker bar to the rocking arm whereby the grate bars are actuated. Fig. 3 is a view in vertical section on line 3—3 of Fig. 2.

To effect the shaking of the grate bars of locomotive engines it is customary to provide a long shaker bar provided at its lower end with a socket adapted to be removably set over the upper end of a rocking arm or lever that extends up through the floor of the locomotive cab. A source of frequent accident is due to the fact that no provision has heretofore been made to insure the secure engagement of the shaker bar with the upwardly extending end of the rocking arm or lever. The result is, that the shaker bar in operation is apt to slip from the free end of the rocking lever and, as the shaker bar is a heavy, metal bar, its accidental disengagement from the lever is apt to injure the fireman or others in proximity thereto.

The present invention has for its object to provide improved means for insuring the effective engagement and locking of the shaker bar to the rocking lever, and to this end the invention consists in the improvements hereinafter described, illustrated in the accompanying drawing, and more particularly pointed out in the claims at the end of this specification.

10 designates the fire box of a locomotive engine, the bottom of which is shown as provided with pivoted grate bars 11 of familiar construction. These grate bars 11 are pivotally connected to a common bar 12 extending beneath the fire box, and to this bar 12 is pivotally connected a bar 13, the rear end of which is pivoted, as at 14, to the lower end of a rocking lever 15 mounted upon the shaft 16, in usual manner. The upper end of the rocking lever 15, which passes through the floor of the cab, is adapted to enter a socket formed in the lower end of my improved shaker bar 20. As shown, the upper end of the rocking lever 15 is formed with a V-shaped notch 17, the purpose of which will presently appear.

The body of the shaker bar 20 is of usual or suitable construction, and its lower end is formed with a socket of a shape corresponding in outline to the upper portion of the rocking lever 15. Thus, it will be seen that the top of the socket formed at the lower end of the shaker bar 20 is provided with a V-shaped projection 21 adapted to enter the V-shaped notch formed in the upper end of the rocking lever 15.

To one side of the shaker bar 20, adjacent its lower end, is suitably fastened, as by screws 22, a spring bar or latch 23. The lower end of this spring bar or latch 23 is provided with a stud or pin 24 that passes through a hole 25 formed in the side wall of the socket of the shaker bar (see Fig. 3), and adapted to enter a seat 18 formed in the side of the upper portion of the rocking lever 15 when the shaker bar is in position for use. Preferably, the lower end of the spring bar or latch 23 has connected thereto, as by a screw-eye 26, a chain 27, whereby the latch can be readily withdrawn when the shaker bar is to be disengaged from the upper end of the rocking lever 15.

From the foregoing description it will be seen that when the shaker bar is to be engaged with the rocking lever 15, the fireman will, by means of the chain 27, draw outward the latch 23, so as to permit the socket of the shaker bar to set completely over the upper end of the rocking lever 15; and as soon as the shaker bar is in proper position upon the rocking lever, the projecting stud 24 of the latch 23 will engage the seat 18 formed in the side of the rocking lever 15. At such time also the V-shaped portion 21 at the top of the socket of the shaker bar 20 will set within the correspondingly shaped upper end 17 of the rocking lever. When the shaker bar is thus in position for use, it will be securely locked to the rocking lever, so that all danger of its accidental disengagement from the rocking lever is avoided. When, however, it is desired to remove the shaker bar from the rocking lever, the fireman will grasp the chain 27 and withdraw the spring bar or latch 23, so as to disengage the pin 24 from the seat 18 of the rocking lever, after which the shaker bar can be readily removed.

One advantage incident to the preferred form of my invention illustrated in the accompanying drawing is, that the latch bar 23 not only serves to effectively interlock the shaker bar to the rocking lever, but also prevents the shaker bar from being engaged with the rocking lever until the latch has been drawn outward by the chain 27, since, if the latch be not drawn outward, the stud or pin 24 of the latch will contact with the upper end of the rocking lever 15 and prevent the entrance of the lever into the socket of the shaker bar. The result is, that the fireman will be sure to effect a proper engagement of the shaker bar with the rocking lever before he attempts to operate the rocking lever.

It is obvious that the precise details of construction above set out may be varied without departing from the spirit of my invention.

Having thus described my invention, what I claim as new, and desire to secure by Letters Patent, is:

1. In shaker mechanism for grate bars, the combination with a rocking lever, of a shaker bar for engagement with said rocking lever and removable therefrom, said shaker bar being provided with a socket having a hole through its wall adjacent its lower end, a spring actuated latch normally projecting through said hole and into said socket to obstruct the entrance of the rocking lever, and means connected to said latch for retracting the same whereby said shaker bar cannot be connected to or detached from said rocking lever without first retracting said latch.

2. In shaker mechanism for grate bars, the combination with the rocking lever having a V-shaped notch in its upper end, of a hand bar for engagement with said lever and removable therefrom, said hand bar being provided with a socket and with a downwardly projecting, V-shaped part within said socket to enter the notch and the end of the rocking lever, and a spring latch adjacent the lower end of said socket and projecting therein for locking said hand bar to said rocking lever.

DAVID BUISSONO.

Witnesses:
Louis M. L. Whitehead,
Katharine Gerlach.